United States Patent

Winkler

Patent Number: 5,344,116
Date of Patent: Sep. 6, 1994

[54] FOOT FOR AN APPLIANCE, SUCH AS A WASHING MACHINE

[75] Inventor: Herbert Winkler, Velbert, Fed. Rep. of Germany

[73] Assignee: YMOS Aktiengesellschaft Industrieprodukte, Obertshausen, Fed. Rep. of Germany

[21] Appl. No.: 980,271

[22] Filed: Nov. 23, 1992

[30] Foreign Application Priority Data

Nov. 27, 1991 [DE] Fed. Rep. of Germany ....... 4138961

[51] Int. Cl.⁵ .................................................. F16M 11/20
[52] U.S. Cl. ............................... 248/677; 248/188.3; 248/638
[58] Field of Search ............. 248/188.2, 188.3, 188.4, 248/637, 638, 677

[56] References Cited

U.S. PATENT DOCUMENTS

| | | |
|---|---|---|
| 1,866,274 | 7/1932 | Stoller ........................ 248/677 |
| 2,281,955 | 5/1942 | Rosenzweig ................ 248/677 |
| 2,660,386 | 11/1953 | Munro ........................ 248/638 |
| 3,815,852 | 6/1974 | May ............................ 248/677 |
| 4,262,870 | 4/1981 | Kretchman et al. ....... 248/188.3 |
| 4,991,412 | 2/1991 | Bauer et al. ................ 248/638 |

Primary Examiner—Richard K. Seidel
Assistant Examiner—Hwei-Siu Payer
Attorney, Agent, or Firm—W. G. Fasse; W. F. Fasse

[57] ABSTRACT

A machine foot has an upper section for connection to a machine bottom and a lower section for resting on a floor. A spring for vibration damping is operatively interposed between the upper and the lower section. In a preferred embodiment an elastically deformable ring member is also interposed between the upper and lower section for diverting at least a component of a vertically effective forces in a radial direction into the lower section by a friction effect which also provides a damping of vibrations of the machine to which the foot is connected, such as an appliance.

14 Claims, 2 Drawing Sheets

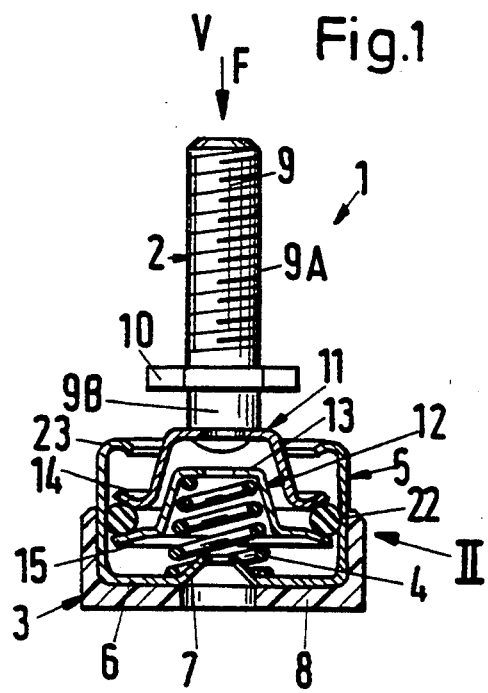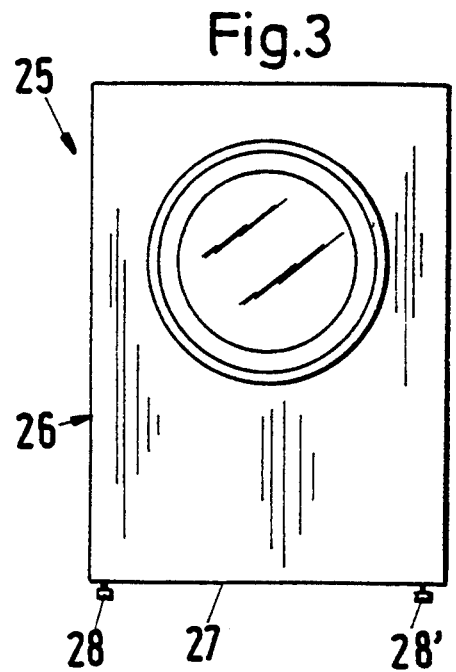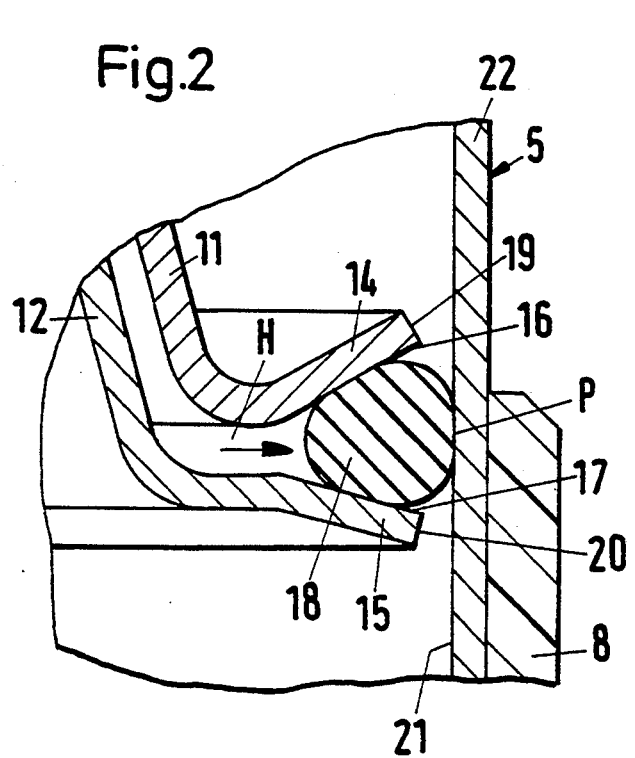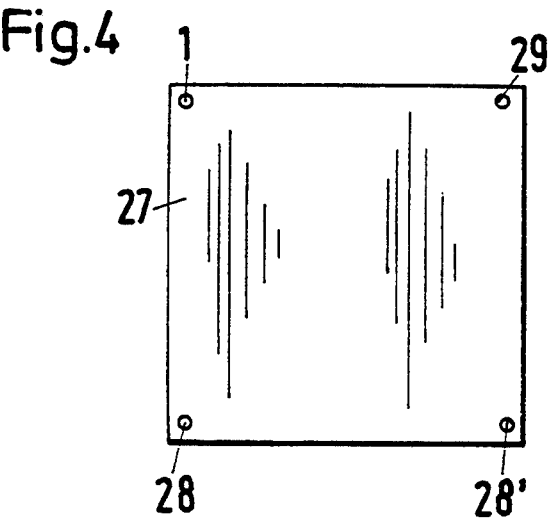

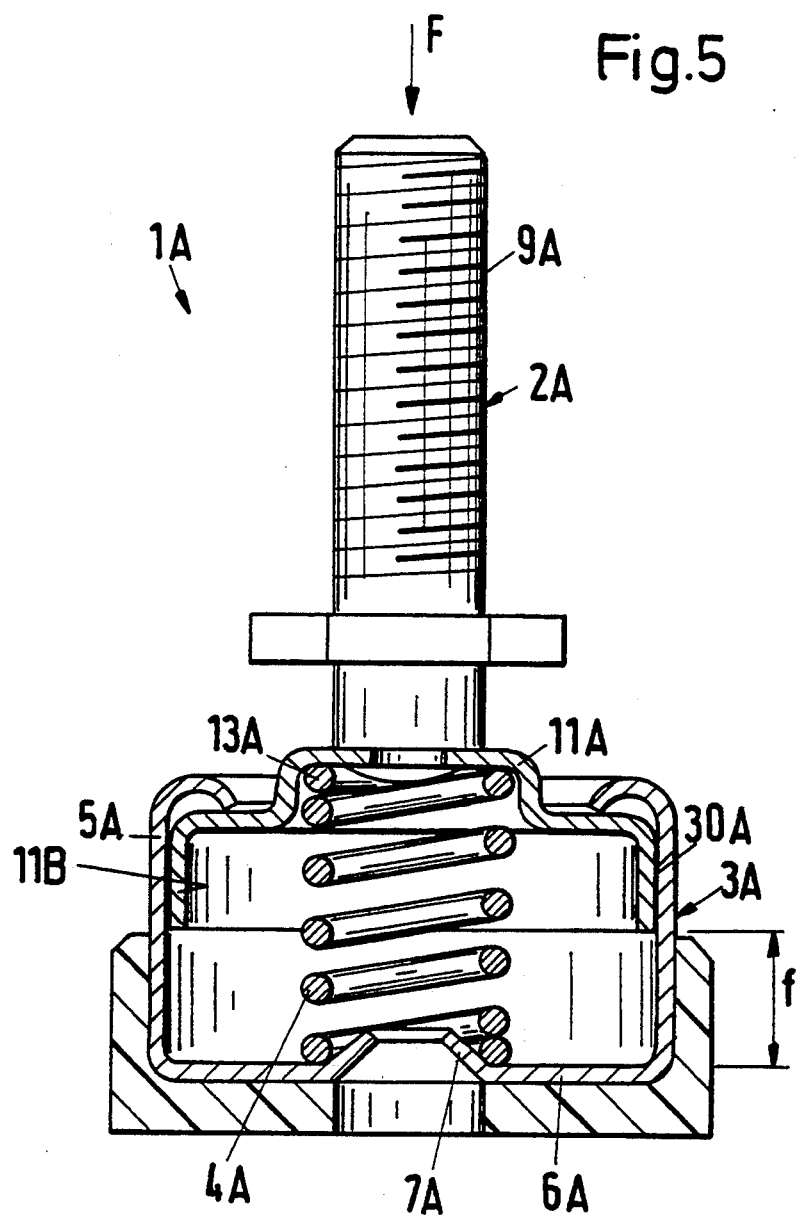

FOOT FOR AN APPLIANCE, SUCH AS A WASHING MACHINE

FIELD OF THE INVENTION

The invention relates to a foot connectable to the bottom of an appliance by a connecting member. Such feet are used particular for washing machines, including washing automats and similar appliances, such as dryers, refrigerators, and the like. The connecting member may be a threaded bolt for adjusting the foot.

BACKGROUND INFORMATION

Machine feet of the type just mentioned are well known in the art. Normally, each corner of the bottom of an appliance housing is equipped with such a foot, whereby uneven elevations are compensated for by an adjustment of the threaded bolt which extends more or less deep into a threading in the bottom of the appliance housing. Such an adjustment is normally performed manually or with a handheld tool, in order to level the appliance independently of any elevational differences in the floor where the appliance is installed.

The exact levelling of an appliance by individually adjusting the machine feet, one after the other, requires some skill. However, substantial problems may occur if, for example, a washing automat, in the form of a so-called substructure machine, must be installed so that the rear feet of the substructure are no longer accessible when the machine has been brought into the installation position, or when these rear feet are accessible only with substantial difficulties. Similar problems arise when a machine must be installed in the corner of a room or in a recess built into the wall, because in those instances at least one of the machine feet is no longer accessible for adjustment.

OBJECTS OF THE INVENTION

In view of the foregoing it is the aim of the invention to achieve the following objects singly or in combination:

to provide an appliance foot capable of permitting with the help of a combination of simple elements, an automatic level self-adjustment within a certain level difference range, so that no further manual adjustment or merely a very small manual adjustment will be necessary, whereby such manual adjustment, if needed at all, can be made prior to positioning the appliance into its operating location;

to provide an appliance foot capable of elastically yielding within certain limits while providing a damping function; and to combine the function of a helical compression spring and of an elastically yielding ring body in an appliance foot for providing a desired load response characteristic.

SUMMARY OF THE INVENTION

An appliance foot according to the invention, comprises an upper section secured to a connecting element and a lower section resting on the floor as well as a spring element between the upper and lower sections or in another suitable spring position.

The spring element is so dimensioned that it can automatically compensate for elevational differences in the floor after merely a rough adjustment of the appliance feet. The compensation is possible because the present feet permit a stepless continuous adjustment of the upper section relative to the lower section within a certain range. For this purpose, it is merely necessary to select the proper spring characteristic. Conical helical springs are preferably used for the present purpose. For a machine or appliance having four feet, the spring constant is determined by taking into account one half of the machine weight and further taking into account the desired spring displacement. It has been found that such a spring selected as described, provides an excellent levelling in response to a static load that applies a certain force caused by the weight of the appliance to the particular foot.

According to a further preferred embodiment of the invention the present foot comprises in addition to the spring an elastically deformable element for taking up dynamic forces resulting, for example, due to periodic or non-periodic vibrations of the appliance. The elastically deformable body is so arranged between the upper and lower sections of the foot that these dynamic forces normally bypass the spring element. The elastically deformable body transfers directly and in a form-locking manner dynamic force components into the lower foot section, whereby the effective direction of these vibrations is taken into account.

BRIEF DESCRIPTION OF THE DRAWINGS

In order that the invention may be clearly understood, it will now be described, by way of example, with reference to the accompanying drawings, wherein:

FIG. 1 is a vertical section through one embodiment of an appliance foot according to the invention;

FIG. 2 shows, on an enlarged scale, the detail II in FIG. 1;

FIG. 3 shows the front view of an appliance equipped with four feet according to the invention;

FIG. 4 is a view against the bottom of the appliance of FIG. 3, showing the position of the four feet; and FIG. 5 illustrates another embodiment of an appliance foot according to the invention.

DETAILED DESCRIPTION OF PREFERRED EXAMPLE EMBODIMENTS AND OF THE BEST MODE OF THE INVENTION

FIG. 1 shows a machine foot or an appliance foot 1 according to the invention comprising an upper section 2 and a lower section 3 with a conical, helical compression spring 4 interposed between the upper section 2 and the lower section 3. The lower section 3 includes a housing 5 having a bottom 6 with a central projection 7 that holds the lower end of the spring 4 against lateral displacement, thereby keeping the spring 4 in a centered position relative to a central axis of the housing 5. An anti-slip cap 8 surrounds the floor facing portion of the housing 5 forming part of the lower section 3. The housing 5 has an upwardly facing opening as best seen in FIG. 1. The upper section 2 of the appliance foot 1 comprises a connector member 9 that is preferably provided with a threading 9A for engaging a threaded hole in the bottom 27 of the appliance 25 for applying a load F to the foot 1. A collar 10 for engagement by a tool surrounds the lower end of the connecting member 9. The lower end 9B of the connecting member 9 is rotatably secured to a first cup-shaped dish 11 having a conical surface configuration and an approximately radially and upwardly extending rim 14. A second cup-shaped dish 12 having a radially outwardly and downwardly extending rim 15 sits on one end of the compression spring 4 for holding the spring 4 in the housing 5. The second dish 12 is arranged in parallel coaxially to the first mentioned dish 11. The two rims 14 and 15 form a circumferential groove, which opens radially outwardly due to the diverging of the rim 14 upwardly and of the rim 15 downwardly.

As shown in FIG. 2, the upper rim 14 has a downwardly facing surface 16 and the lower rim 15 has an upwardly facing surface 17 to form the above mentioned circumferential groove. The second dish 12 is nesting partly within the first dish 11, however without normally contacting the upper dish due to a load dividing member 18 interposed in the above mentioned groove between the surfaces 16 and 17. As long as the dishes 11 and 12 do not contact each other, the forces are introduced into the floor from the connecting element 9 into the first dish 11, through the rim 14, the element 18, the rim 15, the second dish 12, and the spring 4 resting on the floor into the housing 5 and thus into the phase. The load dividing member 18 and the spring 4 are effective in series, unless the friction at P, see FIG. 2, introduces the load caused forces or at least a component thereof directly into the housing 5, as will be described in more detail below. If the lower end 9B of the load applying connector member 9 should contact the top or free end 13 of the second dish 12, the member 18 and the spring 4 are effective in parallel to each other. When the rims 14 and 15 sufficiently compress the load dividing member 18 thereby pushing it radially outwardly, forces can be introduced directly into the housing 5 through the element 18, thereby bypassing the spring 4.

According to the invention the load dividing member 18, as shown in the example embodiment, is an elastically deformable body, for example, in the form of a ring body. Preferably, the ring body 18 is an O-ring fitted between the two conical surfaces 16 and 17 of the rims 14 and 15 of the dishes 11 and 12. The outer diameter of the ring body 18 is so dimensioned that it normally projects slightly radially outwardly beyond the outer circumference 19, 20 of the rims 14 and 15, whereby the ring body 18 will contact the inwardly facing surface 21 of the housing 5 as shown at P in FIG. 2. This inner surface 21 of the housing 5 extends substantially vertically or approximately vertically and is a cylindrical surface since the housing wall 22 of the housing 5 is cylindrical. The housing 5 is substantially open in the upward direction so that the first dish 11 forming part of the upper foot section can extend through the respective opening which is surrounded, for example, by an inwardly flaring rim 23 for reinforcement. The upward opening of the housing 5 is large enough to permit free movement of the dish 11 and of the connecting member 9 secured to the dish 11. Thus, the upper section can freely move relative to the lower section of the foot. The just described elements form a complete machine foot which is a separate mounting unit that can be screwed into the bottom of an appliance with the threading 9A of the connector member 9. Referring to FIGS. 3 and 4, the appliance 25 has a housing 26 with a bottom or floor 27 provided with feet 1, 28, 28', and 29. If the floor is completely level, and all feet are adjusted to the same level, then all feet will carry the same weight or load 7 caused by a respective force shown in FIG. 1. However, when elevational differences exist and a particular foot encounters an elevation, that foot will be exposed to a larger load. When a foot encounters a depression, that foot will be exposed to a smaller load compared to the load applied to the other feet. Depending on the size of the load caused by the weight of the appliance, and depending on the just mentioned elevational differences, the spring element will be compressed more or less with the effect that the upper section 2 with its connecting member 9 will adjust itself to an elevation in which the respective load component F and the force of the spring balance each other. This balancing will further take into account that the load F caused by the weight of the appliance will be introduced into the spring 4 through the ring body 18 that bears against the inner surface 21 of the housing wall 22 at P as described above.

The ring body 18 bears in a force transmitting manner against the surface 21 of the housing wall 22 as viewed in the direction of the force F. Thus, a component H of the force caused by the load F is introduced directly into the lower foot section or of the housing 5. As a result, and as long as only static loads are caused by the load F, the desired leveling takes place automatically to such an extent that the appliance is leveled for all practical purposes. When dynamic loads occur, for example, because the appliance vibrates, the additional elastic ring body or load dividing member 18 takes over the load transmission from the upper section to the lower section in such a way that the spring 4 is substantially completely bypassed. This is due to the fact that the ring body 18 is held by the force of the spring 4 in a position that corresponds to the static state of the foot, whereby, when dynamic forces occur, the ring body is compressed and pushed radially outwardly by the two conical surfaces 16 and 17 of the rims 14 and 15, whereby the body is simultaneously deformed and pressed against the inner surface 21 of the housing wall 22. As a result, the body 18 now bears more strongly against the inner surface of the housing, but does not change its position P in response to the occurrence of vibrations. This desirable feature makes sure that short duration load changes do not cause any elevational readjustment of the upper foot section 2. Thus, vibrations that are, for example, caused by the spin cycle of a washer are taken up by the elastic deformation of the ring body 18 which thus damps these vibrations, whereby the ring body 18 functions as a buffer or damping element which also performs the function of dividing the load F into a vertical load component V and into a horizontal load component H. The slant of the surfaces 16 and 17 forming the conical ring gap, help in the force transmission, whereby the vertically effective load component V is at least partially diverted in the horizontal direction as shown in FIG. 2 to form a radial force that is introduced into the housing wall 22 through the body 18. Thus, the ring body 18 transmits a load component V in a force-locking manner in the vertical direction and a load component H in a form-locking manner in the horizontal direction. The beneficial effect of the elastically deformable ring body 18 is the fact that vibration forces are substantially kept away from the spring 4, or that only small vibration forces are effective on the spring 4. This is due to the fact that the vibration forces or loads are diverted as described, and damped. The damping depends on the elastic deformability of the ring body 18. The force redirection radially outwardly makes sure that the upper and lower sections hardly move relative to each other even when vibrations occur. Thus, the appliance remains leveled.

FIG. 5 shows a modified appliance foot 1A. The components in FIG. 5 that correspond to respective components in FIG. 1 are provided with the same reference number, however, modified by the index A.

The appliance foot 1A comprises an upper section 2A and a lower section 3A with a spring element 4A interposed between the upper and lower sections. The spring element 4A is a helical compression spring, or it may be a helical and conical compression spring as shown in FIG. 1. The upper section 2A comprises the connecting member 9 formed, for example, as a threaded bolt with the threading 9A. The upper section further comprises a cup or dish-shaped spring dish 11A which has a central, upwardly reaching depression in which the free upper end 13A of the spring element 4A is received. The lower end of the spring element 4A is held in place by a central projection 7A thus holding the spring element 4A to the bottom 6A of the lower section 3A that forms a housing 5A with an inwardly flared rim providing an upwardly facing opening in the housing 5A of sufficient size to permit the free movement of the upper section 2A relative to the lower section 3A. The inner surface 30A of the housing 5A forms a guide surface which contacts the outer surface of the axial section 11B of the spring dish 11A in a sliding manner. The downwardly facing edge of the axial section 11B is spaced from the bottom 6A of the lower section 3A by a spacing f which is selected to be sufficient to permit the compensating movements of the spring 4A. The proper guiding of the spring dish 11A inside the lower section 3A makes sure that the appliance is safely and solidly held in place.

Although the invention has been described with reference to specific example embodiments, it will be appreciated that it is intended to cover all modifications and equivalents within the scope of the appended claims.

What I claim is:

1. A self-levelling machine foot, comprising a housing (5) having a central axis and an axially facing opening in said housing (5), a spring holding member (12) inside said housing, a spring (4) held axially inside said housing (5) by said spring holding member (12), means (9, 11) for applying a load (F) to said spring holding member (12) through said axially facing opening, said load applying means (9, 11) comprising a load dividing member (18) positioned in said housing in contact (P) with an inner surface (21) of said housing (5) and in contact with said spring holding member (12) for transmitting a first load component directly into said housing so that said first load component bypasses said spring (4) while a second load component passes through said spring into said housing, wherein said load dividing member (18) and said spring (4) work in series up to a certain load level and in parallel above said certain load level.

2. The self-levelling machine foot of claim 1, wherein said load applying means comprise a dish (11) with an outwardly slanted rim (14) forming a first conical surface (16), and wherein said spring holding member (12) also has an outwardly slanted rim (15) forming a second conical surface (17), said first and second conical surfaces forming a groove, wherein said load dividing member (18) is received for dividing a vertically effective load (V) into said first load component (H) that is effective in a direction other than a vertical direction and into said second load component passing through said spring (4) into said housing (5).

3. The machine foot of claim 2, wherein said first and second conical surfaces (16, 17) are so slanted relative to said central axis that said load dividing member (18) diverts said vertically effective load (V) at least partially into a horizontal direction.

4. The machine foot of claim 2, wherein said load dividing member (18) comprises an elastically deformable ring body received in said groove between said first and second conical surfaces.

5. The machine foot of claim 4, wherein said elastically deformable ring body projects radially outwardly outside of said groove formed by said first and second conical surfaces.

6. The machine foot of claim 2, wherein said dish (11) of said load applying means is a first cup-shaped dish, wherein said spring holding member (12) comprises a second cup-shaped dish, and wherein said first and second conical surfaces (16, 17) form said rims (14, 15) as approximately radially outwardly extending rims on said first and second cup-shaped dishes, whereby one rim diverges in one direction while the other rim diverges in the opposite direction relative to said central axis.

7. The machine foot of claim 6, wherein each of said first and second cup-shaped dishes has an open end, each open end facing in the same direction relative to said central axis, and wherein said second cup-shaped dish is at least partly nesting in said first cup-shaped dish, but spaced from said first cup-shaped dish by said load dividing member (18), said spring (4) extending axially into said second cup-shaped dish, so that one free end of said spring (4) bears against a bottom of said second cup-shaped dish (12) and another end of said spring (4) bears against said housing (5).

8. The machine foot of claim 1, wherein said inner surface (21) of said housing (5) extends substantially vertically.

9. The machine foot of claim 1, wherein said load dividing member (18) comprises an elastically deformable body.

10. The machine foot of claim 9, wherein said elastically deformable body is a ring body.

11. The machine foot of claim 10, wherein said elastically deformable ring body is an O-ring.

12. The machine foot of claim 1, wherein said spring (4) comprises a conical, helical spring.

13. The machine foot of claim 1, wherein said inner surface (21) of said housing is an inner cylindrical surface forming a bearing surface for said load dividing member (18), said load applying means comprising a connector member (9) and a first cup-shaped dish (11) secured to said connector member (9) inside said housing, said connector member extending axially of said opening in said housing, said spring holding member (12) comprising a second cup-shaped dish inside said housing (5), said load dividing member (18) being positioned between said first and second cup-shaped dishes (11, 12).

14. The machine foot of claim 1, wherein said load dividing member (18) is a buffer having a vibration damping characteristic.

* * * * *